United States Patent [19]

Träubel et al.

[11] 4,207,128

[45] Jun. 10, 1980

[54] REACTIVE POLYURETHANE COATINGS

[75] Inventors: Harro Träubel; Klaus König, both of Leverkusen; Hans J. Müller; Bruno Zorn, both of Cologne, all of Fed. Rep. of Germany

[73] Assignee: Bayer Aktiengesellschaft, Leverkusen, Fed. Rep. of Germany

[21] Appl. No.: 734,857

[22] Filed: Oct. 22, 1976

Related U.S. Application Data

[63] Continuation of Ser. No. 616,736, Sep. 25, 1975, abandoned.

[30] Foreign Application Priority Data

Oct. 9, 1974 [DE] Fed. Rep. of Germany ....... 2448133

[51] Int. Cl.$^2$ ............................................. B32B 31/26
[52] U.S. Cl. ..................................... 156/77; 156/230; 260/29.2 TN; 427/244; 427/246; 521/63; 521/64
[58] Field of Search ....................... 427/245, 246, 244; 260/2.5 AL, 2.5 AY, 29.2 TN; 156/77, 230; 521/63, 64

[56] References Cited

U.S. PATENT DOCUMENTS

| | | | |
|---|---|---|---|
| 2,894,919 | 7/1959 | Simon et al. | 260/2.5 AL |
| 2,953,533 | 9/1960 | Khawam | 260/2.5 AL |
| 3,041,293 | 6/1962 | Polacek et al. | 260/2.5 AL |
| 3,384,653 | 5/1968 | Erner et al. | 260/2.4 AL X |
| 3,582,396 | 6/1971 | König et al. | 427/245 |
| 3,632,533 | 10/1972 | Winkler | 260/2.5 AL |
| 3,681,125 | 8/1972 | Träubel et al. | 427/245 |
| 3,692,570 | 9/1972 | Träubel et al. | 427/245 |
| 3,769,381 | 10/1973 | König et al. | 264/41 |
| 3,789,027 | 1/1974 | Träbel et al. | 427/245 |
| 3,920,588 | 11/1975 | Träubel et al. | 260/31.8 G X |
| 4,160,686 | 7/1979 | Niederdellmann | 428/425 X |

FOREIGN PATENT DOCUMENTS

| | | | |
|---|---|---|---|
| 6800529 | 7/1968 | Netherlands | 260/2.5 AL |
| 1193231 | 5/1970 | United Kingdom | 521/155 |

OTHER PUBLICATIONS

Weast et al., *Handbook of Chemistry and Physics*, 46th ed., The Chemical Rubber Co., Cleveland, 1965, p. c-586.

*Primary Examiner*—Evan K. Lawrence
*Attorney, Agent, or Firm*—Gene Harsh; Lawrence S. Pope

[57] ABSTRACT

This invention is concerned with a process for producing microporous coatings comprising (1) mixing an NCO-prepolymer prepared from polyisocyanates with compounds containing at least two isocyanate-reactive hydrogen atoms with about 3 to 40% by weight, based on the NCO-prepolymer, of a substantially inert, non-migrating liquid organic compound miscible with said NCO-prepolymer as a plasticizer; (2) adding about 3 to 300 weight % of water, based on the NCO-prepolymer, into the NCO-prepolymer-plasticizer mixture to form a water-in-oil emulsion; (3) adding a polyamine in a quantity substantially equivalent to the isocyanate groups; (4) applying a coating of the water-in-oil emulsion to a substrate; and (5) hardening the coating by evaporating the chemically unbound water from said coating.

5 Claims, No Drawings

REACTIVE POLYURETHANE COATINGS

This is a continuation of application Ser. No. 616,736, filed Sept. 25, 1975, now abandoned.

FIELD OF THE INVENTION

This invention relates to the coating of leather, split leather and textile materials in the form of sheets with reactive polyurethane systems using plasticizer-containing isocyanate prepolymers.

BACKGROUND OF THE INVENTION

The production of an artificial grain layer on split leather using reactive polyurethane coatings was described for the first time in German Patent Specification No. 878,544. In this process, a solution of an alkyd resin containing free hydroxyl groups and polyisocyanates acting as a crosslinking component is applied to the split leather, and the solvent is then removed by evaporation. According to German Patent Specification No. 872,268 (Example 8), solutions of an NCO-prepolymer and an aromatic diamine are sprayed onto a substrate using a two-jet spray gun, the two solutions only being mixed with one another in the spray jet itself. Similar processes for coating various kinds of substrates are described, for example in German Patent Specification No. 957,564, German Auslegeschrift No. 1,023,449, German Pat. No. 1,240,656, U.S. Pat. No. 3,194,793, German Offenlegungsschrift No. 1,570,524 and U.S. Pat. No. 3,539,424.

The specific coating of leather is comprehensively described, for example, in the Journal "Leder and Häutemarkt", 24 (May, 1972), No. 18, pages 220 to 228, and in Journal of the Society of Leather Technologist and Chemists, 57, pages 59 to 62. As can be seen from these publications, the coating of leather has acquired increasing significance over recent years. When the coated leathers are to be used as starting materials in the manufacture of shoes, the coatings have to meet stringent requirements in terms of flexural strength, scratch resistance, ageing resistance, fastness to light and heat stability. In general, these properties can only be obtained by using polyurethanes.

However, one feature which is common to all previously published processes for coating with reactive polyurethane systems is that either solvents have to be used or, when coating is carried out in the absence of solvents, it is only possible to use certain polyisocyanates and isocyanate prepolymers on account of the excessive viscosity of the reactive system. In reverse coating in particular, considerable importance is attached to reproducing the texture of the temporary substrate as faithfully as possible. This can only be achieved by using low viscosity polyurethane mixtures. However, the use of very low-viscosity (i.e. generally low molecular weight) polyisocyanates introduces the problem that compounds of this kind have a highly toxic effect on account of their relatively high volatility.

In the field of coating textiles with polyurethanes by far the greatest significance is attached to processes in which fully reacted high molecular weight polyurethanes dissolved in suitable solvents (generally dimethyl formamide, optionally in admixture with methyl ethyl ketone or ethyl acetate) are used as starting materials. The solvent is evaporated after the coating solution has been applied to the substrate or alternatively is removed by coagulation in an aqueous coagulation bath. In this particular process, it is possible, by maintaining certain process conditions, to obtain microporous coatings (German Auslegeschrift No. 1,110,607, German Offenlegungsschrifts Nos. 1,444,163; 1,444,165, 1,444,167; 1,694,171; 1,769,277, German Pat. No. 1,270,276). According to German Patent Specification No. 1,694,059, microporous coatings are obtained from solutions of polyurethanes in mixtures of low-boiling solvents and high-boiling non-solvents from which the readily volatile solvent is selectively evaporated after the coating solution has been applied to the substrate.

German Auslegeschrifts Nos. 1,694,180; 1,694,230; 1,694,231 and German Offenlegungsschrift No. 2,034,537 (which corresponds to U.S. Pat. No. 3,788,887) relate to processes for producing microporous films and coatings, in which the starting compounds for polyurethane synthesis (relatively high molecular weight polyhydroxyl compounds, polyisocyanates or isocyanate prepolymers and low molecular weight chain extenders including water) are reacted with one another in an organic solvent which, although dissolving these starting compounds, has increasing difficulty in dissolving the polyurethane formed as the polyaddition reaction progresses, so that, ultimately, it has only a negligible swelling effect upon the fully reactive polyurethane. The still pourable reaction mixture is then applied to a substrate, accompanied by shaping, and polyaddition is completed at a temperature below the softening point of the polyurethane accompanied and/or followed by removal of the solvent. According to another of our own proposals (German Offenlegungsschrift No. 1,694,152 and U.S. Pat. No. 3,625,871), relatively high molecular weight preadducts containing at least two free basic amino groups, optionally dissolved in organic solvents, are dispersed with a non-solvent for the polyadduct to be prepared, optionally using low molecular weight polyamines, the resulting dispersion is mixed with substantially equivalent quantities of a relatively high molecular weight preadduct containing at least two NCO-groups and/or of a low molecular weight monomeric polyisocyanate, the reaction mixture is applied to a substrate, accompanied by shaping, before the end of the polyaddition reaction, polyaddition is completed on the substrate and a microporous coating is obtained following removal of the solvent.

German Offenlegungsschrift No. 1,694,081 (U.S. Pat. No. 3,789,027) describes a process for the production of microporous coatings permeable to water vapor which is distinguished by the fact that monomeric or resin-like polyisocyanates, optionally dissolved in organic solvents, are mixed with a non-solvent (which may even be water) and the resulting mixture is stirred in the absence of emulsifiers to form a dispersion containing isocyanate groups; diamines or polyamines, optionally dissolved in the non-solvent for the polyisocyanates, are then added to the resulting dispersion in quantities substantially equivalent to the isocyanate groups, the reaction mixture is applied to a substrate before the end of the polyaddition reaction, the polyaddition reaction is completed, the solvent used, if any, is removed by evaporation, followed by removal of the non-solvent in the same way. This process is of considerable commercial interest because, basically, it can be carried out in the absence of organic solvents (i.e. solely with water as the liquid reaction medium). Difficulties arise in this process when relatively high molecular weight polyisocyanates of high viscosity are used.

To sum up, therefore, it can be said that, in general, owing to the high viscosity of high molecular weight polyisocyanate conventional processes can only be carried out in the presence of solvents. This not only gives rise to ecological problems, on account of the more or less high toxicity of the solvents, but it also makes the processes uneconomical on account of the high price of solvents. On the other hand, low molecular weight isocyanates, which could be processed in the absence of solvents, can only be used with elaborate safety precautions on account of the toxic properties which they are known to have.

SUMMARY OF THE INVENTION

As already mentioned, the disadvantage of toxicologically acceptable relatively high molecular weight polyisocyanates is that, hitherto, they have only ever been applied from solution on account of their high viscosity. It has now surprisingly been found that the viscosity of relatively high molecular weight isocyanate compounds of this kind can be reduced by the addition of about 1 to 100% by weight and preferably by the addition of about 3 to 40% by weight and, with particular preference, by the addition of about 5 to 30% by weight (based on isocyanate) of plasticizers, to such an extent that they may be readily used in the absence of solvents in reactive systems for coating different kinds of substrates, preferably leather, split leather or textiles.

Surprisingly, leathers coated in this way do not have the property, frequently encountered in the case of polyvinyl chloride coatings, that they cannot be dressed or that the layer of dressing applied disappears after only a short time.

In context of the invention, coating also includes the dressing of (artificial) leather surfaces with thin polyurethane films (approximately 8 to 30µ thick).

Low-viscosity, substantially involatile organic compounds have acquired considerable significance as plasticizers in the processing of polyvinyl chloride. These plasticizers all have the disadvantage of migrating after only a short time, so causing the polymer to turn brittle. When the relatively high molecular weight polyisocyanates used in accordance with the invention are employed, however, the viscosity-reducing compound generally does not show any tendency towards migration, especially when an organic compound capable of being absorbed by the constituents of the textile substrate or by leather is used as plasticizer.

Accordingly, the present invention relates to a process for producing microporous coatings comprising (1) mixing an NCO-prepolymer prepared from polyisocyanates with compounds containing at least two isocyanate-reactive hydrogen atoms with about 3 to 40% by weight, based on the NCO-prepolymer of a substantially inert, non-migrating liquid organic compound miscible with said NCO-prepolymer as a plasticizer; (2) adding about 3 to 300 weight % of water, based on the NCO-prepolymer, into the NCO-prepolymer-plasticizer mixture to form a water-in-oil emulsion; (3) adding a polyamine in a quantity substantially equivalent to the isocyanate groups; (4) applying a coating of the water-in-oil emulsion to a substrate; and (5) hardening the coating by evaporating the chemically unbound water from said coating.

DETAILED DESCRIPTION OF THE INVENTION

Preferred substrates include textile materials in the form of sheets, split leather and leather, although plastics, wood, stone, metals and similar materials may also be coated by the process according to the invention.

The compounds containing isocyanate groups used in accordance with the invention should be substantially involatile for toxicological reasons. It is preferred to use systems of the type which contain less than about 1% by weight and with particular preference less than about 0.7% by weight of volatile substances which can be removed over a period of 1 hour in a vacuum of 12 Torr at 20° C. Before the plasticizers are added, the isocyanates have a viscosity of more than about 500 cP and preferably more than about 1500 cP at 25° C. Their molecular weight is preferably in the range from about 300 to 20,000 and, with particular preference, in the range from about 500 to 10,000.

Suitable compounds containing isocyanate groups include both unmodified and, preferably, modified polyisocyanates and/or reaction products of polyisocyanates with compounds containing at least two isocyanate-reactive hydrogen atoms. In addition to compounds containing amino groups, thiol groups or carboxyl groups, compounds of this kind are, preferably, water and high molecular weight and/or low molecular weight polyhydroxyl compounds. Suitable high molecular weight polyhydroxyl compounds are, for example, polyesters, polyethers, polythioethers, polyacetals, polycarbonates and polyester amides having at least 2 but preferably with 2 to 4 hydroxyl groups having molecular weights in the range from about 500 to 5000, preferably in the range from about 800 to 3000, of the type commonly used in the production of homogeneous and cellular polyurethanes.

Polyesters containing hydroxyl groups suitable for use in accordance with the invention are, for example, reaction products of polyhydric, preferably dihydric and, optionally, also trihydric alcohols with polyvalent, preferably divalent carboxylic acids. Instead of using the free polycarboxylic acids, it is also possible to use the corresponding polycarboxylic acid anhydrides or corresponding polycarboxylic acid esters of lower alcohols or mixtures thereof, for producing the polyesters. The polycarboxylic acids may be aliphatic, cycloaliphatic, aromatic and/or heterocyclic and may optionally be substituted, for example, by halogen atoms, and/or unsaturated. Examples of polycarboxylic acids of this kind include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally in admixture with monomeric fatty acids, terephthalic acid dimethyl ester and terephthalic acid bis-glycol ester. Examples of suitable polyhydric alcohols are ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones, for example, ε-caprolactone or hydroxy carboxylic acids, for example, ω-hydroxy caproic acid, may also be used.

The polyethers containing at least 2, generally 2 to 8, but preferably 2 to 3 hydroxyl groups used in accordance with the invention are also known per se and are obtained, for example, by polymerizing epoxides, such as ethylene oxide, propylene oxide, butylene oxide, tetrahydrofuran, styrene oxide or epichlorhydrin on their own, for example, in the presence of $BF_3$, or by adding these epoxides, optionally in admixture or in succession, to starter components containing reactive hydrogen atoms, such as water, alcohols or amines, for example, ethylene glycol, 1,3- or 1,2-propylene glycol, trimethylolpropane, 4,4'-dihydroxy diphenyl propane, aniline, ammonia, ethanolamine or ethylene diamine. It is also possible to use sucrose polyethers of the type described, for example, in German Auslegeschrifts No. 1,176,358 and 1,064,938. Polyethers modified by vinyl polymers, of the type formed, for example, by polymerising styrene and acrylonitrile in the presence of polyethers (U.S. Pat. Nos. 3,383,351; 3,304,273; 3,523,093; 3,110,695; German Patent Specification No. 1,152,536), are also suitable, as are polybutadienes containing OH-groups.

Particular examples of the polythioethers are the condensation products of thiodiglycol with itself and/or with other glycols, dicarboxylic acids, formaldehyde, aminocarboxylic acids or aminoalcohols. Depending upon the co-components, the products are polythio mixed ethers, polythioether esters or polythioether ester amides.

Examples of polyacetals are the compounds which can be obtained, for example, from glycols such as diethylene glycol, triethylene glycol, 4,4'-dioxethoxy diphenyl dimethyl methane or hexane diol and formaldehyde. Polyacetals suitable for use in accordance with the invention can also be obtained by polymerizing cyclic acetals.

Suitable polycarbonates containing hydroxyl groups are known per se and can be obtained, for example, by reacting diols such as 1,3-propane diol, 1,4-butane diol and/or 1,6-hexane diol, diethylene glycol, triethylene glycol or tetraethylene glycol, with diaryl carbonates, for example, diphenyl carbonate or phosgene.

The polyester amides and polyamides include, for example, the predominantly linear condensates obtained from polyvalent saturated and unsaturated carboxylic acids or their anhydrides and polyvalent saturated and unsaturated amino-alcohols, diamines, polyamines and mixtures thereof such as the compounds disclosed hereinbefore.

Polyhydroxyl compounds which already contain urethane or urea groups, and optionally modified natural polyols, such as castor oil, carbohydrates or starch, may also be used. Addition products of alkylene oxides with phenol-formaldehyde resins or even with urea-formaldehyde resins, may also be used.

Other examples of relatively high molecular weight polyhydroxyl compounds are described, for example, in High Polymers, Vol. XVI, "Polyurethanes: Chemistry and Technology", by Saunders-Frisch, Interscience Publishers, New York, London, Vol. I, 1962, pages 32 to 42 and pages 44 to 54, and Volume II, 1964, pages 5 to 6 and 198 to 199, and also in Kunststoff-Handbuch, Vol. VII, Vieweg-Höchtlen, Carl-Hanser-Verlag, Munich, 1966, for example, on pages 45 to 71.

In addition to water, suitable low molecular weight polyhydroxyl compounds (molecular weight about 18–500) are, for example, the compounds mentioned above as starting components for the polyester.

Suitable polyisocyanates, which may be used as such or, preferably, in the form of their reaction products with water and/or the polyhydroxyl compounds just mentioned and/or other compounds containing Zerewitinoff-active hydrogen atoms in the process according to the invention, may be aliphatic, cycloaliphatic, araliphatic, aromatic and heterocyclic in nature. A detailed description of polyisocyanates of this type may be found, for example, in Justus Liebigs Annalen der Chemie, by W. Siefken, 562, pages 75 to 136. Reference is made by way of example here to ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, also any mixtures of these isomers, 1-isocyanato-3,3,5-trimethyl-5-isocyanatomethyl cyclohexane (German Auslegeschrift No. 1,202,785), 2,4- and 2,6-hexahydrotolylene diisocyanate and any mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate, also any mixtures of these isomers, diphenyl methane-2,4'- and/or -4,4'-diisocyanate, p-xylylene diisocyanate, naphthylene-1,5-diisocyanate, triphenyl methane-4,4',4"-triisocyanate, polyphenyl polymethylene polyisocyanates, of the type which can be obtained by condensing aniline with formaldehyde, followed by phosgenation, and which are described for example in British Patent Specifications No. 874,430 and 848,671, perchlorinated aryl polyisocyanates according to German Auslegeschrift No. 1,157,601, polyisocyanates containing carbodiimide groups of the type described in German Patent Specification No. 1,092,007, the diisocyanated described in U.S. Pat. No. 3,492,330, polyisocyanates containing allophanate groups according to British Patent Specification No. 994,890, Belgian Patent Specification No. 761,626 and published Dutch Patent Application No. 7,102,524, polyisocyanates containing isocyanurate groups of the type described, for example, in German Patent Specification Nos. 1,022,789; 1,222,067 and 1,027,394 and in German Offenlegungsschrifts No. 1,929,034 and 2,004,048, polyisocyanates containing urethane groups, of the type described, for example, in Belgian Patent Specification No. 752,261 or in U.S. Pat. No. 3,394,164, polyisocyanates containing acylated urea groups according to German Patent Specification No. 1,230,778, polyisocyanates containing biuret groups of the type described, for example, in German Patent Specification No. 1,101,394, in British Patent Specification No. 889,050 in French Patent Specification No. 7,017,514 and in U.S. Pat. No. 3,124,605, the polyisocyanates obtained by telomerization reactions described, for example, in Belgian Patent Specification No. 723,640, and U.S. Pat. No. 3,654,106 polyisocyanates containing ester groups of the type described, for example, in British Patent Specifications Nos. 956,474 and 1,072,956, in U.S. Pat. No. 3,567,763 and in German Patent Specification No. 1,231,688, and reaction products of the above-mentioned isocyanates with acetals according to German Patent Specification No. 1,072,385.

It is preferred in accordance with the invention to use reaction products, containing free isocyanate groups, of hexamethylene diisocyanate, tolylene diisocyanate and 1-isocyanato-3-isocyanatomethyl-3,5,5-trimethyl cyclohexane with the compounds containing active hydrogen atoms described above. Excess volatile monomeric diisocyanates are preferably removed from these reaction products before they are used in the process according to the invention, for example, by distillation in a thin-layer evaporator.

The substantially involatile compounds containing isocyanate groups which are peferably used in accordance with the invention also include, for example, the reaction products of 1 mol of trimethylol propane and 3 mols of tolylene diisocyanate, or 1 mol of water and 2 mols of tolylene diisocyanate or the polyisocyanate containing biuret groups obtained from 1 mol of water and 3 mols of hexamethylene diisocyanate.

The substantially involatile, non-migrating, liquid organic compound used in accordance with the invention in a quantity of from about 1 to 100% by weight, preferably in a quantity of from about 3 to 40% by weight and, with particular preference, in a quantity of from about 5 to 30% by weight, based on polyisocyanate, acts as a viscosity-reducing plasticizer for the highly viscous polyisocyanate.

Plasticizers suitable for use in accordance with the invention must be miscible with the compound containing isocyanate groups and should be substantially inert with respect to isocyanates, in other words should not contain any free hydroxyl or amino groups. They preferably have a viscosity of from about 5 to 20,000 cP and, with particular preference, from about 10 to 1,000 cP (at 20° C.), and a volatility of less than about 10%, preferably less than 5% (expressed by the weight loss after storage for 72 hours at 90° C. in a drying cabinet, for example, a Brabender—rapid moisture determination apparatus.

Plasticizers particularly suitable for use in accordance with the invention are organic compounds of the type which are compatible with or have a certain affinity for the polyurethane formed and for a substrate, for example, those that are able to form chemical or hydrogen bonds with amino, hydroxy, acid amide or ester groups. Compounds of this kind preferably contain salts of at least one of the groups —COOH, —OSO$_2$OH or —SO$_3$H.

Plasticizers preferably used in accordance with the invention also include phenol esters of long-chain sulphonic acids and phthalic acid esters. Phosphoric acid esters, monocarboxylic acid esters, dibenzyl ethers and chlorinated aromatic hydrocarbons, of the type commonly used as plasticizers in the plastics-processing industry, may also be used in accordance with the invention providing they have the physical properties described above.

The following compounds are mentioned as examples of plasticizers suitable for use in accordance with the invention: mixtures of fatty acids and sulphonated fatty acids, of the type formed in the sulphonation of triglycerides on a commercial scale, neat's-foot oil, turkey red oil, chlorinated paraffin hydrocarbons, dibutyl phthalate, dioctyl phthalate, tributyl phosphate, triethyl hexyl phosphate, the diphenyl esters of lauryl sulphonic acid, palmitic sulphonic acid, stearyl sulphonic acid and also chlorinated diphenyl.

The solvent-free mixture of polyisocyanate and (based thereon) about 1 to 100% by weight of the plasticizer should have a viscosity of less than about 15,000 cP, preferably less than about 5000 cP and with particular preference less than about 1500 cP (at 20° C.), to guarantee satisfactory processing of the reactive systems according to the invention.

In addition to the high molecular weight and/or low molecular weight polyhydroxyl compounds (including water) referred to above, compounds having isocyanate-reactive groups suitable for use in the process according to the invention in addition to polyisocyanates and plasticizers, include aliphatic and/or aromatic polyamines. Polyamines suitable for use in accordance with the invention are, for example, ethylene amine, 1,2- and 1,3-propylene diamine, 1,4-tetramethylene diamine, 1,6-hexamethylene diamine, diethylene triamine, N,N'-diisobutyl-1,6-hexamethylene diamine, 1,11-undecamethylene diamine, 1,12-dodecamethylene diamine, cyclobutane-1,3-diamine, cyclohexane-1,3- and -1,4-diamine, also mixtures thereof, 1-amino-3,5,5-trimethyl-5-aminomethyl cyclohexane, 2,4- and 2,6-hexahydrotolylene diamine and mixtures thereof, perhydro-2,4'- and 4,4'-diaminodiphenyl methane, p-xylylene diamine, bis-(3-aminoprpyl)-methyl amine, etc. It is also possible in accordance with the invention to use hydrazine and substituted hydrazines, for example, methyl hydrazine, N,N'-dimethyl hydrazine and their homologues, and also acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semi-carbazido alkylene hydrazides such as, for example, β-semi-carbazidopropionic acid hydrazide (German Offenlegungsschrift No. 1,770,591), semi-carbazido alkylene carbazinic esters such as, for example, 2-semi-carbazidoethyl carbazinic ester (German Offenlegungsschrift 1,918,504) or even amino semicarbazide compounds such as, for example, β-aminoethyl semi-carbazidocarbonate (German Offenlegungsschrift 1,902,931).

Examples of suitable aromatic diamines include bis-anthranilic acid esters according to German Offenlegungsschrifts Nos. 2,040,644 and 2,160,590, 3,5- and 2,4-diaminobenzoic acid esters according to German Offenlegungsschrift 2,025,900, the diamines containing ester groups described in German Offenlegungsschrifts Nos. 1,803,635; 2,040,650 and 2,160,589, and also 3,3'-dichloro-4,4'-diaminodiphenyl methane, tolylene diamine, 4,4'-diaminodiphenyl methane and 4,4'-diaminodiphenyl di-sulphide.

All these chain extenders may be dissolved in one of the aforementioned plasticizers or even in water. It is even possible to use organic solvents, although this procedure is not recommended for the reasons explained above.

The overall equivalent ratio between polyisocyanates and compounds containing active hydrogen atoms may be varied within wide limits, e.g. from 0.8 to 3.5, preferably from 0.95 to 2 and with particular preference from 1.0 to 1.4 (of course, these figures do not refer to the embodiment wherein water acts both as a chain extender and as a dispersing agent).

It is possible, although not generally necessary (especially in cases where polyamines are used as chain extenders) to use catalysts in the process according to the invention. Suitable catalysts are catalysts known per se, for example, tertiary amines such as triethyl amine, tributyl amine, N-methyl morpholine, N-ethyl morpholine, N-coco-morpholine, N,N,N',N'-tetramethyl ethylene diamine, 1,4-diazabicyclo-(2,2,2)-octane, N-methyl-N'-dimethyl aminoethyl piperazine, N,N-dimethyl benzyl amine, pentamethyl diethylene triamine, N,N-dimethyl cyclohexyl amine, N,N,N',N'-tetra-methyl-1,3-butane diamine, N,N-dimethyl-β-phenyl ethyl amine, 1,2-dimethyl imidazole and 2-methyl imidazole.

Tertiary amines containing isocyanate-reactive hydrogen atoms are, for example, triethanolamine, triisopropanol amine, N-methyl diethanol amine, N-ethyl diethanol amine, N,N-dimethyl ethanol amine, and also their reaction products with alkylene oxides such as propylene oxide and/or ethylene oxide.

Other suitable catalysts are silaamines containing carbon-silicon bonds of the type described, for example, in German Patent Specification No. 1,229,290, for example, 2,2,4-trimethyl-2-silamorpholine or 1,3-diethyl aminomethyl tetramethyl disiloxane.

Other suitable catalysts include nitrogen-containing bases such as tetraalkyl ammonium hydroxides, and also alkali hydroxides such as sodium hydroxide, alkali phenolates such as sodium phenolate or alkali alcoholates such as sodium methylate. Hexahydrotriazines may also be used as catalysts.

According to the invention, it is also possible to use organometallic compounds, especially organo tin compounds, as catalysts.

Preferred organo tin compounds include tin(II)salts of carboxylic acids such as tin(II)acetate, tin(II)octoate, tin(II)ethyl hexoate and tin(II)laurate, and the dialkyl tin salts of carboxylic acids, such as, for example, dibutyl tin diacetate, dibutyl tin dilaurate, dibutyl tin maleate or dioctyl tin diacetate.

Other representatives of catalysts suitable for use in accordance with the invention and information on the way in which the catalysts function may be found in Kunststoff-Handbuch, Vol. VII, Vieweg and Höchtlen, Carl-Hanser-Verlag, Munich, 1966, for example, on pages 96 to 102 and High Polymers, Vol. XVI, "Polyurethanes, Chemistry and Technology" by Saunders-Frisch, Interscience Publishers, New York, London, Vol. I, 1962, pages 129–215.

The reactive coating systems according to the invention of polyisocyanate, plasticizer, isocyanate-reactive compounds and optionally, water may be applied to the substrate by any processes, for example, by casting, spray coating, printing or plush-coating. It is even possible, for example, to spray onto the substrate a mixture of polyisocyanate and plasticizer on the one hand and the compounds containing isocyanate-reactive groups, optionally dissolved in plasticizers or water, on the other hand in two separate jets using a suitable spray gun, so that the polyurethane is formed "in situ" on the substrate.

As already mentioned, microporous coatings can also be produced simply and economically in the absence of solvents by the process according to the invention in accordance with the process disclosed in German Offenlegungsschrift No. 1,694,081 (U.S. Pat. No. 3,789,027). To achieve this, from about 3 to 300% by weight, preferably from about 5 to 100% by weight and, with particular preference, from about 10 to 30% by weight, based on polyisocyanate, of water are dispersed in the polyisocyanate already mixed with the plasticizer, the resulting dispersion is stirred in the absence of emulsifiers to form a dispersion containing isocyanate groups and a polyamine, optionally dissolved in water or a plasticizer, is added to the resulting dispersion in a quantity substantially equivalent to the isocyanate groups, the reacting mixture is applied to the substrate, the polyaddition reaction is completed at elevated temperature and, finally, the excess water is removed by evaporation, or a catalyst capable of catalyzing the reaction of isocyanate groups with water is optionally added to the reaction mixture.

By virtue of the wide variety of starting products suitable for use in accordance with the invention, it is possible to vary the reaction time, reaction temperature and all the other parameters of the process according to the invention within wide limits. Thus, reaction temperature and curing temperature maybe varied between about 150° C. and room temperature. Unless coarse-pored, foam-like coatings are required, the upper limit to the reaction temperature is imposed by the boiling points of the volatile substances (for example water) present, if any.

In one particular embodiment of the process according to the invention, the reactive system is applied in a very thin layer (approximately 8 to 30μ thick) as a dressing to leather or leather substitutes. It is possible in this way to obtain thin firmly adhering lacquer layers on leather, polyurethane or PVC surfaces without any need to use solvents.

The process according to the invention is illustrated by the following Examples. Unless otherwise stated the figures quoted represent parts by weight and percentages by weight.

EXAMPLE 1

Reducing the viscosity of NCO-prepolymers by adding plasticizer.

(A) A polypropylene glycol ether of molecular weight 2,000 is dehydrated at 110° L C./13 Torr. The dehydrated polyether is added to a 6-fold excess of 1,6-hexane diisocyanate. After stirring for 2 hours at 100° C., the product is freed from excess 1,6-hexane diisocyanate in a thin-layer evaporator. The product then contains 0.3% of free diisocyanate. It has an NCO-content of 3.14% and a viscosity of 1860 cP at 25° C.

Dibutyl phthalate is used as plasticizer.

Table 1

| Prepolymer (parts) | Plasticizer (parts) | Viscosity at 20° C.(cP) |
|---|---|---|
| 100 | 0 | 2100 |
| 90 | 10 | 1450 |
| 80 | 20 | 980 |
| 70 | 30 | 620 |
| 60 | 40 | 380 |
| 50 | 50 | 280 |
| 40 | 60 | 220 |
| 30 | 70 | 100 |
| 20 | 80 | 80 |
| 10 | 90 | 30 |
| 0 | 100 | — |

(B) The standard commercial-grade reaction product of 1 mol of water and 3 mols of 1,6-hexane diisocyanate freed from monomeric diisocyanate by thin-layering, is used as the NCO-prepolymer. It has an NCO-content 21% by weight and a viscosity of more than 15,000 cP.

A standard commercial-grade alkyl sulphonic acid ester corresponding to the formula:

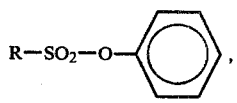

in which R represents a mixture of alkyl groups having 10 to 18 carbon atoms, is used as plasticizer. The plasticizer is a pale yellow liquid having a density of 1.05, a viscosity of 100 cP at 20° C. and a molecular weight of 390.

Table 2

| Prepolymer (parts) | Plasticizer (parts) | Viscosity at 20° C.(cP) |
|---|---|---|
| 100 | 0 | >15,000 |
| 80 | 20 | 3,200 |
| 60 | 40 | 1,700 |
| 50 | 50 | 1,020 |
| 40 | 60 | 650 |
| 20 | 80 | 400 |
| 0 | 100 | 100 |

In a second test, dibutyl phthalate is used as plasticizer.

Table 3

| Prepolymer (parts) | Plasticizer (parts) | Viscosity (cP) |
|---|---|---|
| 100 | 0 | >15,000 |
| 80 | 20 | 2,600 |
| 60 | 40 | 850 |
| 50 | 50 | 420 |
| 40 | 60 | 230 |
| 20 | 80 | 90 |
| 0 | 100 | — |

EXAMPLE 2

50 parts of the triisocyanate of Example 1 B, 250 parts of diethylene glycol polyadipate (OH-number 60), 2 parts of myristyl alcohol, 2 parts of the polysiloxane having terminal hydroxyl groups obtained as in Example A 9 of German Offenlegungsschrift 1,694,081, (U.S. Pat. No. 3,789,027) and 10 parts of dibutyl phthalate were heated for 1 hours to 100° C. This gives lacquer A. A second mixture (B) was prepared, differing from mixture (A) solely by the fact that 10 parts of the alkyl sulphonic acid ester from Example 1 B were used instead of dibutyl phthalate.

A roughened cotton fabric was reversed coated by known methods with a standard commercial-grade solution of an aliphatic polyurethane urea in toluene-isopropanol (as a surface layer) and an adhesion-promoting layer of a standard commercial-grade aromatic polyurethane dissolved in methyl ethyl ketone.

A mixture of 100 parts of lacquer A and 3 parts of tin dioctoate was applied to the polyurethane-coated fabric by printing. Drying for 2 minutes at 150° C. produced a smooth, satisfactorily levelling high-gloss lacquer dressing.

Equally good results can be obtained by using a fabric having a conventional PVC coating instead of the polyurethane-coating fabric. It was found that, in this case, a priming coat of an aliphatic polyurethane (before application of the lacquer mixture according to the invention) prevented the migration of plasticizers from the PVC through the lacquer. However, this difficulty only occurred when highly volatile plasticizers, for example, diethyl phthalate, were present in the PVC mass.

100 parts of lacquer mixture B were stirred with 5 parts of a standard commercial-grade addition product of propylene oxide and ethylene diamine having the idealized formula N,N,N',N'-tetra(hydroxy propyl)-ethylene diamine, and the resulting mixture sprayed by means of an airless spray gun onto the above-described polyurethane-coated fabric and onto the polyvinyl chloride foam artificial leather primed with an aliphatic polyurethane urea. After drying for 2 minutes at 150° C., high-gloss finishes were obtained in both cases.

EXAMPLE 3

A standard commercial-grade glycerin-started polypropylene glycol ether (molecular weight 3000) was continuously reacted at 100° C. with a 6-fold molar excess of 2,4-tolylene diisocyanate. The reaction product was freed from monomeric tolylene diisocyanate by thin-layering and thereafter had a viscosity of 7400 cP (25° C.) and an NCO-content of 3.32%. 10 parts of a standard commercial-grade PVC plasticizer based on n-chloroparaffin were added to 100 parts of this prepolymer (viscosity of the mixture: 5500 cP at 20° C.). The product was heated to 60° C. in a heatable stirrer-equipped vessel of a standard commercial coating machine of the Transpol 204 type. The throughput was adjusted to 488 g (350 n Mol of NCO) per minute by means of a gear pump. The product was delivered to the mixing head through a flexible hose capable of being heated to 100° C.

A second vessel containing a mixture of 435 g of adipic acid dihydrazide, 200 g of water, 300 g of a standard commercial-grade titanium dioxide pigment preparation treated with casein and 75 g of a standard commercial-grade polydimethyl siloxane acting as leveling agent. This hardener solution was delivered to the mixing head by means of a gear pump at a rate of 138 g (425 m Mol of NH$_2$) per minute. In a reverse coating process, silicone matrixes or release papers as temporary substrates, optionally prefinished with nitrocellulose or polyurethane, were introduced into the machine at a belt speed of 1.5 meters per minute (spraying width 1 meter) and sprayed with the reactive mixture. Various textiles or leather were applied onto the still reacting layer. After passing through a drying tunnel (6 minutes at 80° C.), the temporary substrates were removed, leaving soft, extremely flexible and scratch resistant foamy coatings.

In a similar test, the same substrates were directly coated. Soft, flexible and scratch-proof coatings were again formed.

EXAMPLE 4

17.5 g of sulphonated chloroparaffin were added to 58 g of a prepolymer (50 m Mol of NCO) from 1000 g of a branched polypropylene glycol ether (molecular weight 3,000) and 168 parts of hexane diisocyanate which had been freed from monomeric diisocyanate by thin-layering. The mixture had a viscosity at 20° C. of 6000 cP.

20 g of water were introduced at room temperature using a high-speed stirrer. Following the addition of 1.36 g of diaminoethane (45.5 m Mol of NH; NCO/NH=1.1), the mixture was stirred for 5 seeconds and then applied to a glass plate. After another 6 seconds, a cotton fabric was applied to the still tacky coating.

A microporous coated fabric was formed having a permeability to water vapor of 1.1 mg/h.cm$^2$, as measured in accordance with IUP 15, "DAS LEDER" 1961, pages 86–88).

EXAMPLE 5

19.5 g of dioctyl phthalate were added to 63.5 g (50 m Mol of NCO) of the prepolymer of Example 3 [$\eta$=2600 cP at 20°] 20 g of water were stirred in at 20° C. The water contained 1% of a urethane of stearyl isocyanate and diethanol amine acting as an emulsifier.

1.19 g of hydrazine hydrate (47.5 m Mol of NH: NCO/NH=1.05) in 5 g of water were converted into the carbonate by introducing carbon dioxide and added with stirring to the emulsion described above. After stirring for 8 seconds, the reacting system was doctor-coated onto a release paper, split leather and a bonded non-woven, respectively, applied after another second and the water present in the coating evaporated, leaving a grained, coated split leather and a coated nonwoven fabric with a permeability to water vapor of 0.8 mg/h.cm$^2$.

The bonded non-woven had been produced as follow:

13 g of a 1.5 den/40 mm polyethylene terephthalate carded web, which had been needle-punched 12 times, was impregnated with a mixture of the prepolymer of Example 1 B, 0.3 g of polydimethyl siloxane, 0.3 g of tin dioctoate, 15 g of an NCO-prepolymer (from a diethylene glycol-started linear copolyether of 25 mol % of ethylene oxide and 75 mol % of propylene oxide having a molecular weight of 4000 and twice the molar quantity of hexane diisocyanate) freed from monomeric isocyanate by thin-layering, 15 g of neat's foot oil and 13 g of a PVC-plastisol of the following composition:

750 g of polyvinyl chloride (K-value 70)
750 g of di-2-ethylhexyl phthalate
15 g of dibutyl tin dilaurate
15 g of copper phthalocyanine formulated in polypropylene glycol (molecular weight 2000)

dipped into a water bath containing 1% of ethylene diamine and heated to 80° C. and then dried (the impregnating-agent mixture had a viscosity of 3900 cP at 20° C.).

EXAMPLE 6

20 g of dibenzyl phthalate were added to 63.5 g (50 m Mol of NCO) of the prepolymer described in Example 3 [$\eta$=2200 cP at 20° C.]

This was followed by the addition of 3.5 g of adipic acid dihydrazide (40 m Mol of NH$_2$), dissolved in 15 g of a standard commercial-grade 40% anionic polyurethane dispersion (based on an adipic acid-hexane diol/-neopentyl glycol copolyester, hexane diisocyanate and ethylene diamine), 4 g of a urethane from stearyl isocyanate and diethanol amine as emulsifier and 4 g of a standard commercial-grade titanium dioxide dispersion which had been formulated with casein, after which the mixture was stirred for 3 seconds at room temperature and then poured onto a non-woven fabric. A soft, coated artificial leather permeable to water vapor was formed.

EXAMPLE 7

3 g of dioctyl phthalate were added to 50.8 g (40 m Mol of NCO) of the prepolymer of Example 3 [$\eta$=1500 cP at 20° C.]. 1.43 g of 3,3'-dimethyl-4,4'-diaminodicyclohexyl methane (12 m Mol of NH) and 1.8 g of adipic acid dihydrazide (20 m Mol of NH) were dissolved in 5 g of water. 2 g of polydimethyl siloxane and 2 g of a cadmium red pigment formulated with casein were added to the resulting solution.

The plasticizer-containing prepolymer and the amine mixture were stirred together and the reaction mixture doctor-coated onto a steel band. 60 seconds after mixing, a roughened cotton fabric was placed upon the still tacky mass and the water evaporated, leaving behind a coating having a permeability to water vapor of 0.9 mg/h.cm$^2$ (as measured in accordance with IUP 15; cf. "DAS Leder" 12 (1961) pages 86–88).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of microporous coatings comprising:
   (a) mixing an NCO-prepolymer prepared from polyisocyanates with compounds containing at least two isocyanate-reactive hydrogen atoms with about 3 to 40% by weight, based on the NCO-prepolymer, of a substantially inert, with respect to isocyanate groups, viscosity-reducing, non-migrating liquid organic compound miscible with said NCO-prepolymer as a plasticizer, wherein
      (i) said NCO-prepolymer is used free from solvents, has a viscosity of more than about 500 cP at 25° C. and a molecular weight of from about 300 to 20,000,
      (ii) said plasticizer has a volatility of less than 10% weight loss after storage for 72 hours at 90° C., and
      (iii) the resultant NCO-prepolymer-plasticizer mixture has a viscosity of less than about 15,000 cP at 20° C.,
   (b) dispersing 3 to 300% by weight of water, based on the NCO-prepolymer, into the NCO-prepolymer-plasticizer mixture to form a water-in-oil emulsion,
   (c) adding a polyamine to the water-in-oil emulsion in a quantity substantially equivalent to the isocyanate groups.
   (d) applying a coating of the water-in-oil emulsion to a substrate and
   (e) hardening the coating by evaporating the chemically unbound water from said coating.

2. A process for the production of microporous coatings comprising:
   (a) mixing an NCO-prepolymer prepared from polyisocyanates with compounds containing at least two isocyanate-reactive hydrogen atoms with about 3 to 40% by weight, based on the NCO-prepolymer, of a substantially inert, with respect to isocyanate groups, viscosity-reducing, non-migrating liquid organic compound miscible with said NCO-prepolymer as a plasticizer, wherein
      (i) said NCO-prepolymer is used free from solvents, has a viscosity of more than about 500 cP at 25° C. and a molecular weight of from about 300 to 20,000,
      (ii) said plasticizer has a volatility of less than 10% weight loss after storage for 72 hours at 90° C., and (iii) the resultant NCO-prepolymer-plasticizer mixture has a viscosity of less than about 15,000 cP at 20° C., (b) dispersing 3 to 300% by weight of water, based on the NCO-prepolymer into the NCO-prepolymer-plasticizer mixture to form a water-in-oil emulsion, (c) adding a polyamine to the water-in-oil emulsion in a quantity substantially equivalent to the isocyanate groups, (d) directly coating the water-in-oil emulsion on a substrate, and (e) hardening the coating by evaporating the chemically unbound water from said coating.

3. The process of claim 2 wherein the polyamine is dissolved in water.

4. The process of claim 3 wherein a catalyst capable of catalyzing the reaction of isocyanate groups with water is added to the water-in-oil emulsion.

5. A process for the production of microporous isocyanate polyaddition product coatings comprising:

(a) mixing an NCO-prepolymer prepared from polyisocyanates with compounds containing at least two isocyanate-reactive hydrogen atoms with about 3 to 40% by weight, based on the NCO-prepolymer, of a plasticizer wherein (i) the NCO-prepolymer contains less than about 1 wt. % of volatile substances which can be removed over a period of 1 hour in a vacuum of 12 Torr, has a viscosity of more than about 500 cP at 25° C. and has a molecular weight of from about 300 to 20,000, (ii) the plasticizer is an organic compound which has a volatility of less than 5% weight loss after storage for 72 hours at 90° C., is chemically inert to isocyanate groups, is miscible with the NCO-prepolymer, and has an affinity for the ultimately formed isocyanate polyaddition product, and (iii) the mixture has a viscosity of less than about 15,000 cP at 20° C., (b) adding about 3 to 300 wt. % of water based on the NCO-prepolymer to said mixture to form a water in oil emulsion, said water having dispersed therein a diamine in a quantity substantially equivalent to the isocyanate groups to form an isocyanate polyaddition product with the NCO-prepolymer, (c) applying a coating of the water-in-oil coating emulsion to a substrate, and (d) hardening the coating by evaporating the chemically unbound water from it at temperatures below the boiling point of the lowest boiling point volatile contained in the coating.

* * * * *